United States Patent [19]
Fields et al.

[11] Patent Number: 4,520,234
[45] Date of Patent: May 28, 1985

[54] REMOTE CABLE SWITCHING SYSTEM

[75] Inventors: Gary C. Fields, Oakland, Calif.; Gary E. Long, Loveland, Colo.

[73] Assignee: Remote Switch Systems, Inc., Loveland, Colo.

[21] Appl. No.: 483,501

[22] Filed: Apr. 11, 1983

[51] Int. Cl.³ .................... H04M 11/00; H04M 3/00; H04Q 1/28
[52] U.S. Cl. ................ 179/2 A; 179/175.25; 179/84 VF; 179/98; 179/16 R
[58] Field of Search .............. 179/175.3 R, 18 EA, 179/1.1, 2 A, 175.25, 84 VF, 77, 18 GF, 18 GE, 98

[56] References Cited

U.S. PATENT DOCUMENTS 3,562,435 2/1971 Joel .................................. 179/16 R
3,920,927 11/1975 DeLuca .......................... 179/16 R Primary Examiner—Stafford D. Schreyer
Attorney, Agent, or Firm—David B. Harrison

[57] ABSTRACT

Apparatus and methods for a remote cable switching system for selectively switching pairs of an incoming trunk to one or the other corresponding pairs of two available outgoing trunks are disclosed. The system includes at least one remote switch module, a normally quiescent remote control module, and a central office controller which provides the remote control module with operating power and with switching commands during a command sequence. The remote control module accumulates power and decodes the sent switching commands in order to operate identified bistable switches of the switch module to establish the desired matrix. Circuitry for remotely testing proper tip-ring orientation of the connected pairs is provided at the central office is also disclosed and claimed.

12 Claims, 7 Drawing Figures

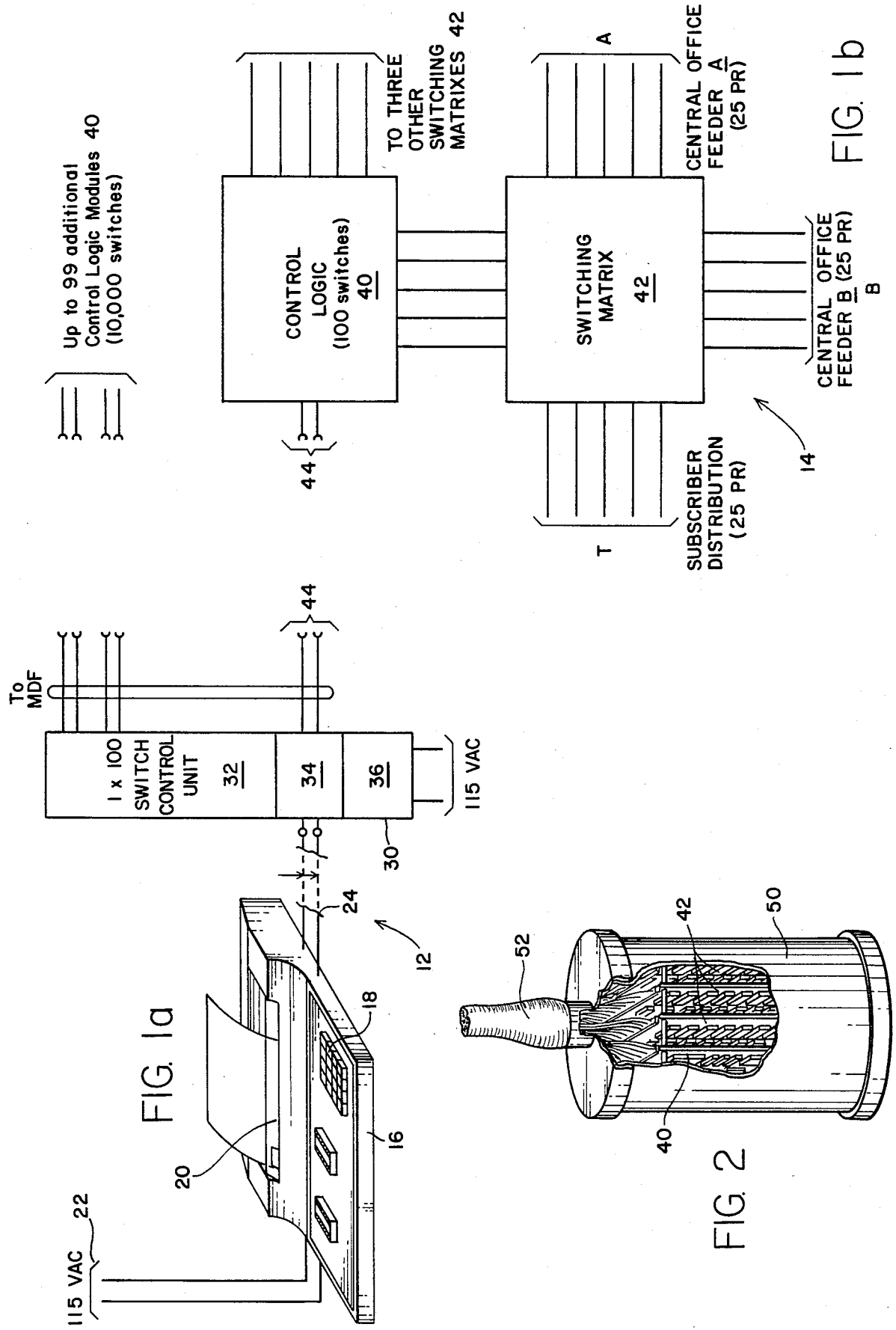

REMOTE CABLE SWITCHING SYSTEM

BACKGROUND OF THE INVENTION

The present invention relates to outside plant communications trunk switching apparatus and methods. More particularly, the present invention relates to methods and apparatus for selectively switching remotely located pairs of one trunk to one or the other corresponding pairs of two available trunks from a central control location.

Communications companies, particularly telephone utility companies, are rapidly decentralizing switching operations from single location central offices located in the heart of dense population centers to locations closer to subscribers. One reason for this decentralization is the increased reliability of central office electronic switching systems which are capable of reliable operation with very little maintenance or attention. Another reason for decentralization is the size, numbers and cost of the cable pair runs from distant subscribers to a central location. It is more economical to collect the cable pairs at a remotely controlled satellite central office, close to the subscribers than it is to feed all of the wire pairs to a single distant location.

A need has arisen to provide an effective way for switching pairs of a telephone trunk from one central office to another central office incident to the decentralization of communications switching systems. Heretofore, one approach has been to provide a hard-wired, manual cross-connect system, such as the 3M MS2 Modular Hardwire System offered by 3M Company, Minneapolis, Minn. The drawbacks of such a system are that a cable splicer technician has been required to install and check the jumpers every time a switch has been made. This has required that the technician drive to the remote cross-connect site, enter the housing for the terminal blocks, identify the terminals to be cross-connected, make the cross connections, and then check the connections with technicians located at the terminal ends of the trunks to be sure that the intended cross-connect has been made. This manual procedure was very time consuming and very expensive.

One other procedure followed was to splice loading coils into the trunk and bridge the two trunks together. The loading coils were then removed when the old trunk was disconnected. That approach had the drawback of interjecting a degree of unreliability into the communications paths as the manual splicing work took place.

Thus, a need has arisen for an automatic switch system to switch pairs reliably from one trunk to another trunk to facilitate cut over to new satellite central offices.

A separate, heretofore unfulfilled need has arisen for a remotely controlled switch system which can be centrally operated to switch communications pairs between trunks extending to separate buildings or locations within a single subscriber communications system, as with a company having several buildings or separate operating locations which are interconnected to a single switchboard. Such a system would facilitate switching from the single switchboard to enable employees to move easily from building to building without interruption of telephone service.

Yet another need has arisen for a remotely operated switching system within a subscriber's multiple line telephone system which adds to it the capability to select communications paths from a plurality of pairs in excess of system capacity, so that telephone outlets in excess of the subscriber's needs may be installed to provide the subscriber with flexibility in the placement of its personnel within its facilities.

One more need has arisen for a remotely controlled cable switching system which will maintain a set switch matrix state without power, which derives all of its operating power from a control path from the central control point during a switching or testing sequence, but not otherwise, and which uses commonly available multi-tone bursts (e.g. touch tones) to provide switching commands.

Remotely controlled central office main distribution frame automatic switching systems have been proposed in the prior art. One representative example of a central office switch system is found in the Amos E. Joel, Jr., U.S. Pat. No. 3,562,435, assigned to Bell Telephone Laboratories, Inc. Therein, a constantly powered automatic switch matrix was proposed to connect one side of the main frame to the other side, i.e. outside cable pairs from subscribers to inside plant switching and call handling equipment. That system was very complex and provided true matrix switching, as is required for main frame distribution connections. While a teletypewriter was described as a preferred input-output device, it did not employ multi-burst tones to effectuate switching changes. Moreover, the complex switching apparatus required constant power from the central office power supply in order to maintain its matrix state. Thus, the complex cumbersome switching apparatus proposed by the Joel, Jr., patent did not suggest a solution to the needs identified hereinabove.

Other references known to applicants include the Hjortendal et al. U.S. Pat. No. 3,993,871 which described a reed relay matrix arranged as a cross-connect, but with the requirement of a constant current holding circuit to maintain matrix state. The Kapel et al. U.S. Pat. No. 3,763,325 described a manually operated patch-cord panel for cross-connect. Such system would not be suitable for outside plant locations subjected to the elements, and it suffers from the same drawbacks in requiring an onsite technician as does the manual 3M cross-connect system. The Ueda et al. U.S. Pat. No. 4,079,207 describes a central office switching system including concentration circuits and line hunting functions implemented with plural switch matrixes. The Mehaffey et al. U.S. Pat. No. 4,028,498 is illustrative of a PABX system which includes a cross-connect switch matrix. The switching points are controlled and monitored by a computer. The Anderson U.S. Pat. No. 4,153,943 is illustrative of cross-point switching within a main frame computer memory bank. It shows a serially addressed connection location scheme. While these reference are pertinent to establish the state of the art, they do not singly, or in combination, teach or suggest the present invention.

SUMMARY OF THE INVENTION

A general object of the present invention is to provide a remote cable switching system which overcomes the limitations and drawbacks of the prior art.

Another object of the present invention is to provide a remote cable switching system which establishes connections of pairs of a single incoming trunk to selected pairs of plural outgoing trunks during switch command intervals when it is active, and which retains its matrix switch pattern indefinitely after the command interval and without power.

A further object of the present invention is to provide a remote cable switching system which receives and accumulates its operating power and which receives switch commands from a central control location only during a command sequence.

Yet another object of the present invention is to provide a remote cable switching system which responds to standard multi-tone signalling bursts to arrange bistable switch elements during a command sequence and which returns to a quiescent powered-down state following the command sequence.

One more object of the present invention is to provide a remote cable switching system which includes means for remotely testing connection orientation of each pair during a command sequence.

A still further object of the present invention is to provide a central controller at a central location which operates a plurality of remote cable switching systems which are located at different locations remote from the central controller and wherein the central controller includes the capability for testing and reporting switching arrangements to the operator.

Yet another object of the present invention is to provide a remote cable switching system which is inexpensive to make and install, adapted for automatic use and operation, and which is reliable over extended time periods without maintenance or operator attention.

These objects of the present invention are realized in a remote cable switching system which selectively switches communications pairs of an incoming trunk to one or the other corresponding pairs of two available outgoing trunks. The system includes the following parts:

At least one remote switch module is provided which has input terminals accomodating e.g. 25 input pairs and which has output terminals accomodating e.g. 50 output pairs. The switch module includes e.g. 25 latching switches having contacts connected to the input pairs and connectable to the output pairs in accordance with switching commands received.

A normally quiescent remote control module is associated with and operatively connected to the remote switch module. The control module is connected to a central office controller, and the control module derives not only its operating power but also electrical switching commands from the controller via a dedicated communications pair. The control module decodes the switching commands and accumulates and applies switching power to the addressed latching switch of the switch module during a command sequence. Tests may also be applied via the control module during a command sequence. After a command sequence, the control module powers down and returns to a quiescent state.

A central controller is located at a central location removed from the remote switch and control modules. The controller includes a data input and output for receiving switching information and for reporting switching status and conditions to an operator. The central controller converts switching information into a switching command and sends the command, together with operating power, to the remote control module during a command sequence. Preferably, the switching command is comprised of multi-tone bursts which are carried with the power sent to the remote switch module during a command sequence.

The method of the present invention includes the steps of:

providing at least one module of latching switches connected for arranging N pair connections of an incoming communications trunk at a remote location in switched connection between 2N corresponding output pair connections of two outgoing trunks at the remote location in accordance with switching energy and commands received from a central location during a command sequence;

receiving and decoding switching commands and receiving and accumulating switching power at the remote switch location and then selecting and applying switching power to operate the selected remote latching switch during the command sequence; and, generating switching commands from a central location and sending the commands, together with operating power, to the remote switch location via a communications pair during a switching interval.

The method may also include testing the tip and ring connection orientation of the connected pairs during a command sequence and reporting the status of the switches and the connection orientation of the pairs to an operator at the central location.

These and other objects, advantages and features of the present invention will be apparent to those skilled in the art from consideration of the following detailed description of a preferred embodiment, presented in conjunction with the accompanying drawing.

BRIEF DESCRIPTION OF THE DRAWINGS

In the drawings:

FIGS. 1A and 1B comprise a pair of block diagrams illustrating the major components of the remote cable switching system incorporating the principles of the present invention.

FIG. 2 is an orthogonal view in side elevation of a remote switch subsystem as depicted in FIG. 1B in one form of all-weather housing for exterior uses, with a portion of the housing broken away to reveal the subsystem installed therein.

DETAILED DESCRIPTION OF A PREFERRED EMBODIMENT

Figure 3A:
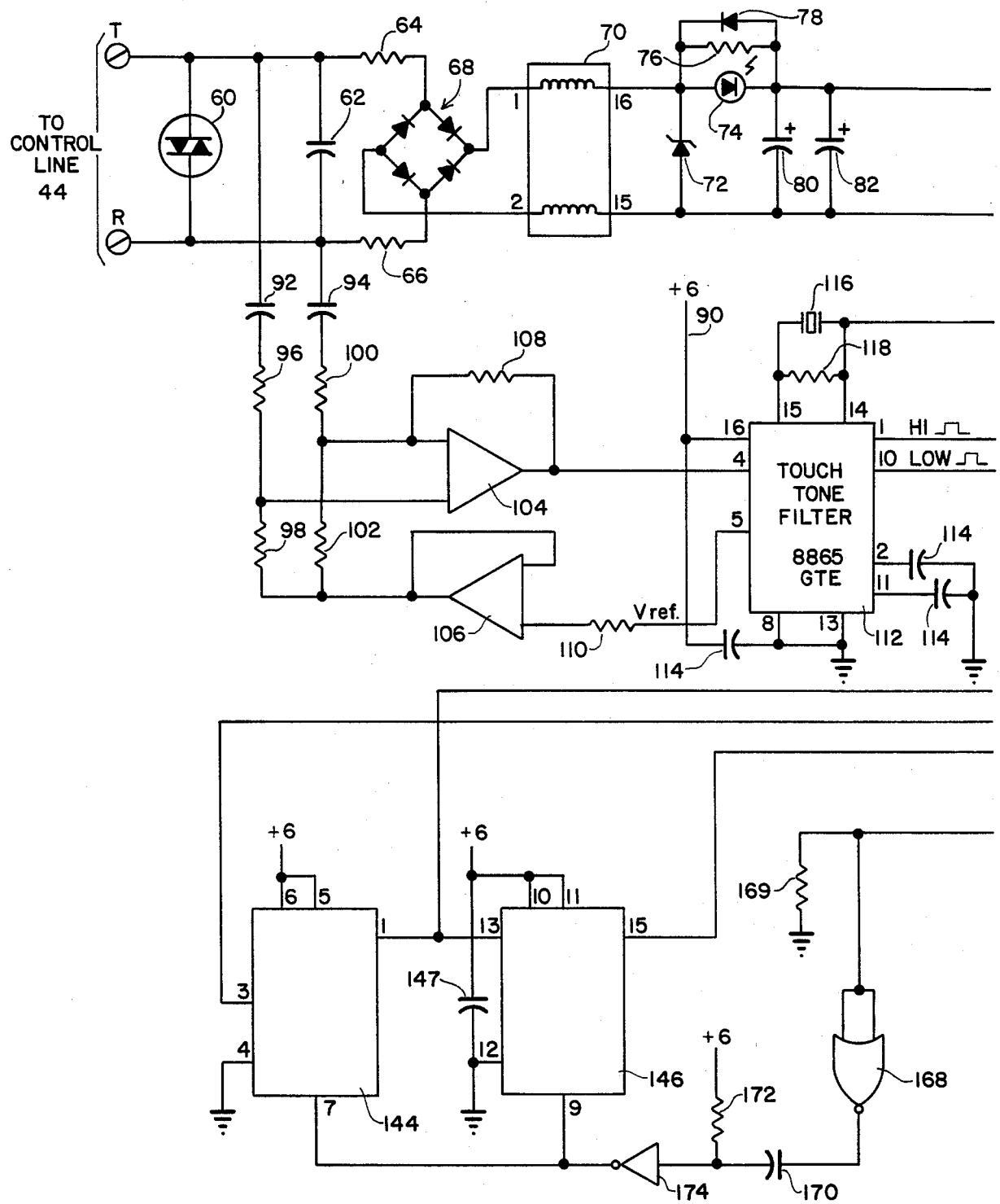
FIGS. 3A and 3B are an electrical block logic and circuit schematic diagram of the details of the remote control module of the system depicted in FIG. 1B.

A remote cable switching system 10 incorporating the principles of the present invention is illustrated in FIGS. 1A and 1B as including two major subsystems: a central control subsystem 12 and a remote switch subsystem 14. The central control subsystem 12 includes a data input/output device 16, such as a computer send-receive terminal, such as a model 743ksr, manufactured by Texas Instruments, Dallas, Tex., or equivalent. The terminal device 16 includes a keyboard 18 to enable an operator to provide data to the system, and a printer 20 to enable the system to print data for the operator. The terminal 16 is connected to line current via a power cord 22, and it is connected to the system 10 via a serial data line 24 modified to send and receive touch tone control signals and to print out test results.

The terminal device 16 is connected by its serial data line 24 to one of a plurality of switch control units 30. One such unit is depicted in FIG. 1A.

The switch control unit 30 comprises a logic array 32 which routes switching commands generated by the terminal device 16 to a selected one of up to e.g. one hundred remote switch subsystems 14 which it is connected. Within the logic array 32 of the switch control unit 30 there are electrically erasable programmable read only memories 34 which record the present matrix state of such subsystem 14. As a switch matrix is changed, the read only memory is likewise changed. In this way, the control unit 30 contains an electrical record of the switch matrix of each subsystem 14 with which it is connected. This matrix may be polled by the device 16 and the connections recorded in the memories printed out to the operator.

The control unit 30 includes an internal constant power supply 36 which is capable of providing constant current in a range between 20 and 30 ma to a selected remote subsystem 14 during a switching sequence. The powr supply 36 also provides operating power to the logic array 32 and the programmable memories 34 within the control unit 30.

One of the plurality of remote switch subsystems 14 is depicted in the block diagram of FIG. 1B and in the structural diagram of FIG. 2. Each subsystem 14 preferably includes one control logic module 40 and four switch matrix modules 42 controlled by the logic module 40. With the arrangement shown, each subsystem 14 is capable of switching up to e.g. 100 incoming pairs between the corresponding pairs of two outgoing trunks.

The circuitry of the control logic module 40 is depicted in, and discussed hereinafter in connection with, FIG. 3. Each switch matrix module 42 is identical to the others, except for module addressing, and its circuitry is depicted in FIG. 4.

The control logic module 40 is operated by signals from the central switch control unit 30 by control commands and power supply provided over a wire pair 44. Each module 40 has its own wire pair extending to the control unit 30, and the pair is preferably the extra pair traditionally provided within 100 pair cable binder groups. If an extra pair is not available within a trunk, an available pair from another trunk may be used. Alternatively, a hybrid circuit may be provided by hybrid coils and balanced connections between the pairs of the trunk cable. In any event a metallic pair is required in order to provide the power supply needed to operate the control logic module during a switching sequence.

FIG. 2 depicts one suitable form of housing for one of the remote switch subsystems 14 depicted in block diagram form in FIG. 1B. In FIG. 2 the subsystem 14 comprises one control logic module circuit board 40 and three switch matrix module circuit boards 42, to provide a switching capacity of 100 pairs. The subsystem 14 depicted in FIG. 2 is housed in a sealed all-weather container 50 of the type usually provided for loading coils and other telephone outside plant equipment which must be housed on utility poles or in cable vaults and which is therefore exposed to the elements. A single cable 52 contains the switchable pair incoming trunk T (labelled "Subscriber Distribution" in FIG. 1B) and the two outgoing trunks A and B (labelled "Central Office Feeder A" and "Central Office Feeder B" in FIG. 1B). This cable 52 is the spliced into the three trunks at a suitable splicing location.

In the event that a remote switch subsystem 14 is to be installed indoors, as in a communications cable distribution room, a suitable cabinet may be provided for the modules 40 and 42 providing ready access to the service technician. Preferably, the modules include jacks and terminals to facilitate connection to the trunks T, A and B. In this way, a subsystem 14 may be replaced by unplugging the old modules and plugging in new replacement modules.

CONTROL MODULE 40

Figure 3B:
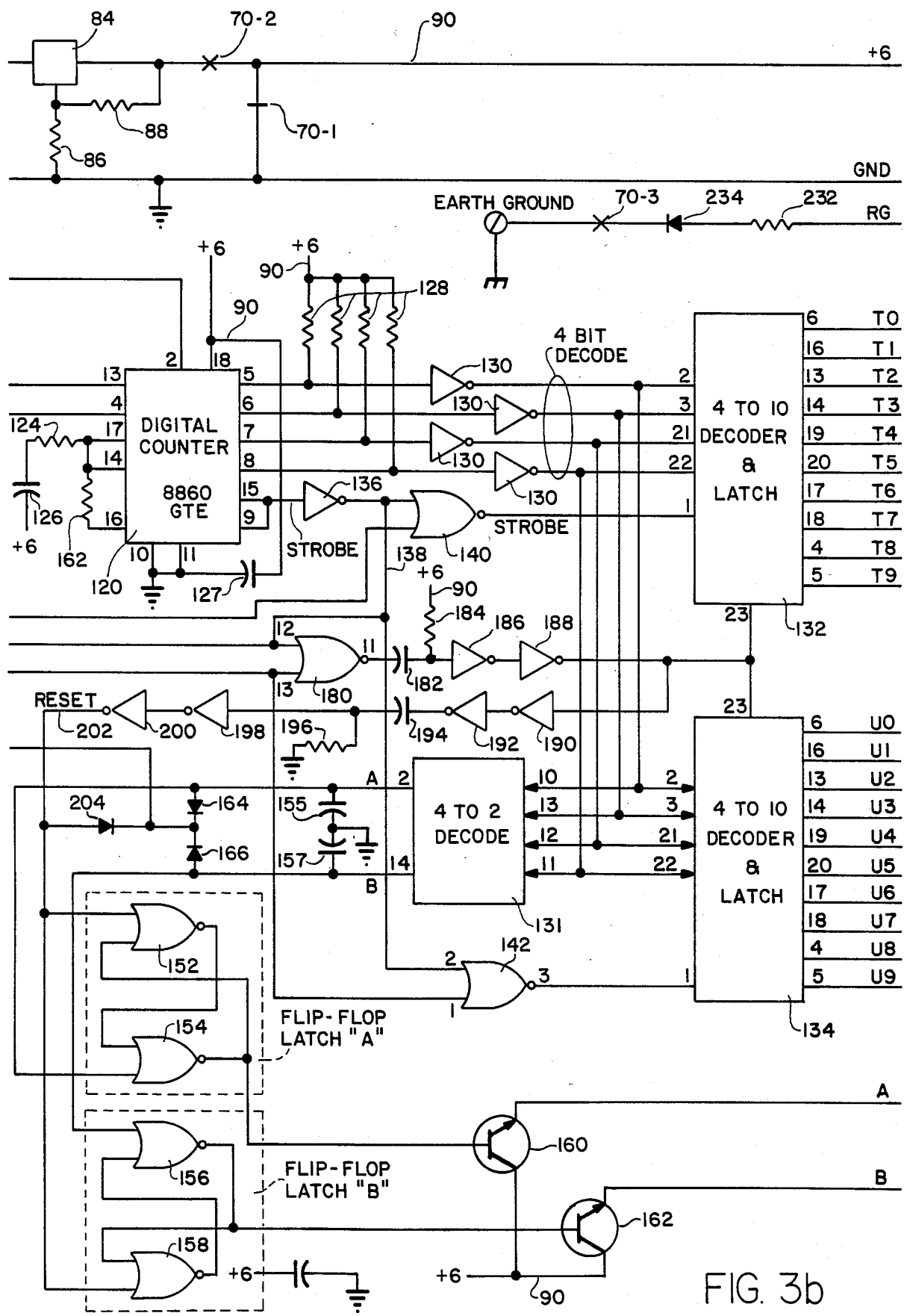
Figure 4A:
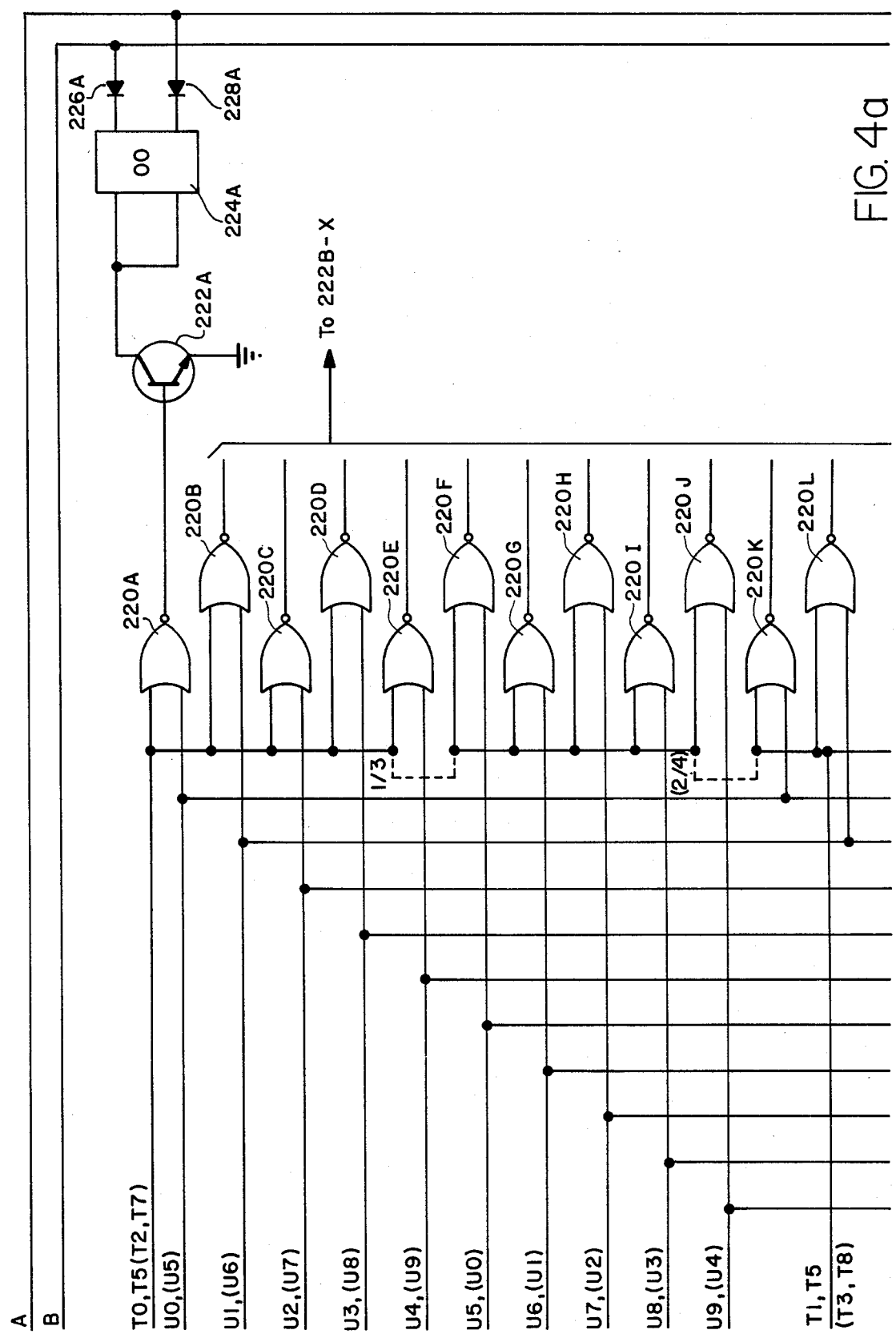
FIGS. 4A and 4B are an electrical block logic and circuit schematic diagram of the details of the remote switch module of the system depicted in FIG. 1B.
Figure 4B:
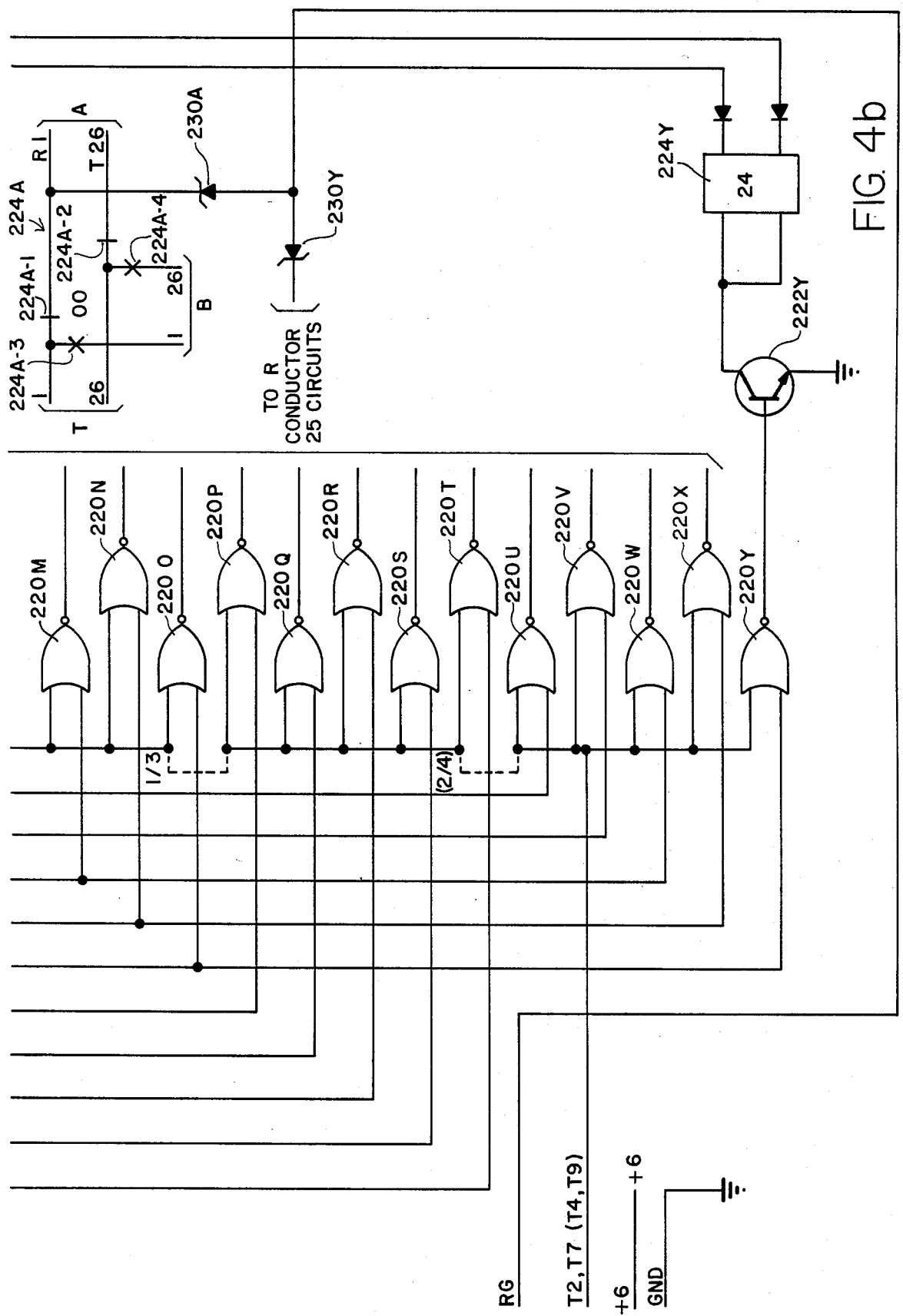

It will be appreciated by those skilled in the art that FIGS. 3 and 4 employ a type of notation for switch contacts referred to as "detached contact" notation in which an "X" shown intersecting a conductor represents a normally open "make" contact of a relay, and a "bar" shown intersecting a conductor at right angles represents a normally closed "break" contact of a relay. The reference numeral used with each such contact includes the numeral given to the relay, a dash and a numeral identifying the particular contact. Thus, the numeral 70-3 refers to the third contact of the relay 70.

Referring now to FIG. 3, the circuitry of a control module 40 will be described. A control pair 44 carries both electrical power and switch select information during a command sequence. The control pair 44, comprising tip and ring wires, is connected to a 130 volt varistor 60. The varistor 60 provides suitable over-voltage protection to the circuitry of the module 40 against voltage transients in the pair 44. A small value bypass capacitor 62 removes extraneous noise and radio frequency signals from the pair 44.

A termination network formed of resistors 64 and 66 which are in series with nodes of a polarity determining diode bridge 68 and two coils of a control relay 70 provide a termination impedance of approximately 600 ohms to the pair 44. This termination impedance is required to facilitate removal of control data from the pair in the form of a "touch tone" burst sequence which identifies the switching operations to be made during the control sequence.

A twenty volt zener 72 limits the voltage at its nodes. A light emitting diode 74 mounted on the conrol module 40 provides a visual indication that current is flowing during a command sequence. A current bypass resistor 76, and a diode 78 protect the LED 74.

Power flowing via the control pair 44 is accumulated in a capacitor 80 having a high storage capacity. The capacitor 80 is typically of a value of 1000 microfarads. Each relay of the matrix module 42 requires typically a 100 milliampere pulse of ten milliseconds duration to change state. This current pulse comes from the power reservoir provided by the capacitor 80. Seven switches per second are possible with the power supply arrangement shown in FIG. 3, providing it receives 20 milliamperes current continuously during the switch control sequence. With seven switches per second, there are 80 milliseconds between each switch, and it is during this 80 millisecond period that the capacitor 80 recharges in preparation for the next switch.

A small value capacitor 82 decouples the input of a variable voltage regulator 84. The regulator 84 is programmed to deliver +6 volts regulated output. The +6 volt level is set by a divider network comprising resistors 86 and 88. The +6 volts is delivered to the other circuitry of the control module 40 and the circuitry of the switch matrix modules 42 via a supply bus 90.

During a switch control sequence, the control relay 70 opens a normally closed contact pair 70-1 bridging the supply bus 90 to ground, and it closes a normally open contact pair 70-2 which thereby connects the output of the regulator 84 to the supply bus 90.

"Touch tones" are set during a switch control sequence, along with the constant current power supply. The touch tones are sensed on the control pair 44 by a connecting network including two direct current blocking capacitors 92, 94, and two impedance matching series resistor networks: a first network of resistors 96 and 98, and a second network of resistors 100 and 102. An unbalancing circuit comprises an operational amplifier 104, and an operational bias-providing amplifier 106. The amplifier 104 has its non-inverting input connected to the common node between the resistors 96 and 98, and its inverting input connected to the common node between the resistors 100 and 102. A gain setting resistor 108 is connected to feed back a portion of the output of the amplifier 104 to the inverting input thereof. The bias op amp 106 has its output connected to the common node between resistors 98 and 102 and also to one input thereof. The other input thereof is connected through a resistor 110 to a reference voltage terminal of an integrated circuit 112. The integrated circuit 112 provides a touch tone decode function, and it is preferably implemented as a type 8865 touch tone decoder, manufactured by GTE, Mitel, or equivalent. This particular decoder requires a voltage unbalanced touch tone input, which is achieved by the operational amplifiers 104 and 106. A transformer could be used in lieu of the amplifiers 104 and 106 with greater prime cost and space requirements.

The decoder 112 functions to divide the incoming multi-tone touch tone control signals into high band (1209 to 1633 Hz) and low band (697 to 941 Hz) tones. Capacitors 114 provide required bypass and decoupling for the decoder 112, and a crystal 116 with a parallel resistor 118 provide a frequency standard for the decoder 112, in accordance with the manufacturer's directions for use.

The decoder 112 puts out the high band tones as square waves via an output pin 1, and puts out the low band tones as square waves via an output pin 10. These output pins are connected to corresponding inputs of a monolithic special purpose digital counter 120, type 8860 made by GTE, Mitel, or equivalent.

A network comprising two series resistors 122 and 124, and a capacitor 126 to ground in series with the resistor 124, is connected to the counter 120 in accordance with the manufacturer's instructions for use. A capacitor 127 provides required decoupling and bypass of the chip 120. The counter 120 actually counts the simultaneously received high band and low band square waves and puts out a four bit binary code indicative of the particular one of sixteen possible values encoded as the touch tone command. The binary values are put out at pins 5, 6, 7 and 8 of the decoder 20. Pull up resistors 128 are connected between these pins and the supply bus 90 to set initial data values at binary "one".

Each control sequence comprises three separate touch tone bursts: the first burst indicates the switch state of the selected switch, i.e. whether its incoming pair T will be connected to a corresponding pair of the "A" trunk or a corresponding pair of the "B" trunk. The second burst indicates the tens of the switch identifier, and the third burst indicates the units of the switch identifier.

Each four bit binary control word is inverted by inverters 130 and then latched into one of three latch decoders 131, 132 and 134.

The decoder 131 operates upon the first four bit number decoded, and decodes that number into either an "A" switch state control signal or a "B" switch state control signal. The A and B control circuitry following the decoder 131 will be described hereinafter.

The decoders 132 and 134 each decode the four bit control word into one of ten digits. The decoder 132 puts out the tens digit (T0 through T9) and the decoder 134 puts out the units digit (U0 through U9). The two outputs of the decoders 132 and 134 thus specify a number between 00 and 99, which corresponds to the identity of a latch relay of a switch matrix module 42 whose state is to be changed.

The digital counter 120 also puts out a strobe signal at pins 9 and 15. This strobe indicates the presence of a decoded control word at the four bit output of the counter 120, and is used to operate the latch-decoders 132 and 134. The decoder 131 operates without using the strobe signal. The strobe is inverted by an inverter 136 and then sent via a strobe line 138 to the chip enable input of the decoder 132 (through a NOR gate 140, and to the chip enable input of the decoder 134 (through a NOR gate 142).

The first strobe pulse on the strobe line 138 sets a flip-flop 144. The second strobe pulse clocks the flip-flop 144 so that its output at pin 1 thereupon changes state and enables the NOR gate 140 and thereby sets the chip enable input of the tens latch-decoder 132 to latch and save the binary value of the second incoming control pulse which signifies the tens value of the switch to be operated.

The third strobe pulse on the strobe line 138 clocks the flip-flop 144 and a flip-flop 146 which enables the NOR gate 142 and sets the chip enable input of the units latch-decoder 134 to latch and decode the value of the third incoming control pulse of a control sequence which signifies the units value of the switch to be operated. A capacitor 147 decouples the flip-flop 146 according to good engineering practices. It will be appreciated by those skilled in the art that the flip-flops 144 and 146 are configured to provide a zero-to-two counter: their outputs are zero during the A/B burst, one during the tens burst, and two during the units burst.

As already explained, the first burst provides the switch state control signal which is decoded into an A signal or a B signal by the decoder 131. The "A" or "B" signals are chosen to have a binary value other than from zero through nine, so that an A or a B burst will never be decoded by the decoders 132 or 134.

An "A" output pin 2 of the decoder 131 is connected to an "A" flip-flop latch formed of two gates 152, 154, wired as shown in FIG. 3. A small value capacitor 155 shunts pin 2 to ground to provide some pulse shaping. A "A" output pin 14 of the decoder 131 is connected to a "B" flip-flop latch formed of two gates 156, 158, wired as shown in FIG. 3. A small value capacitor 157 shunts pin 14 to ground to provide pulse shaping. The "A" flip-flop latch is connected to a driving transistor 160, and the "B" flip-flop latch is connected to a driving transistor 162. The output of the transistor 160 is the A control line, and the output of the transistor 162 is the B control line.

Assuming that the decoder 131 puts out an "A" pulse, the "A" flip-flop is set, the A transistor 160 is enabled, and an enabled state appears at the A line. Assuming that the decoder 131 puts out a "B" pulse, the "B" flip-flop is set, the B transistor 162 is enabled, and an enabled state appears at the B line. One of the A and B control lines is enabled, to the exclusion of the other, during a control sequence for a particular latch relay.

The A and B outputs from the decoder 131 are connected through one-way diodes 164 and 166 to the input of an inverter 168. The input of the inverter 168 is normally held at logical zero by a pull down resistor 169. The inverter 168 changes state whenever either an A or a B pulse is put out by the decoder 131. A capacitor 170 and a resistor 172 form a differentiator which yields a pulse with the onset of each A or B control burst. An inverter 174 shapes the pulse and generates a clocking pulse which clocks the flip-flops 144 and 146, as already explained.

Returning to the strobe line 138, it is connected through an inverter 180 and a differentiating capacitor 182 and resistor 184, through two tandem connected Schmidt triggers 186 and 188 to the commonly connected clock inputs of the latch-decoders 132 and 134. Each time the counter 120 puts out a strobe the latch-decoders 132 and 134 are clocked. Only one of them will be enabled for a particular burst, and then only a second or third burst carrying tens or units information.

Two tandem connected Schmidt triggers 190 and 192 are connected to receive and shape the clocking pulses operating the latch-decoders 132 and 134. These Schmidt triggers 190 and 192 form a differentiator with a series capacitor 194 and a pull up resistor 196 to create a sharp reset pulse. The pulse is further shaped by two more Schmidt triggers 198 and 200 and then put out over a reset line 202. The reset line 202 resets the A and B flip-flops, and also the flip-flops 144 and 146 via a connection to the input of the inverter 168 through a one way diode 204.

SWITCH MATRIX MODULE 42

A twenty-five latch switch module 42 is depicted in FIG. 4. There are four such modules in each remote subsystem 14, but only one of them will be described. Each line pair T to be switched between corresponding pairs of trunk A and trunk B essentially includes three electrical elements, and optionally includes a fourth element. The three elements are a NOR gate 220, a driver transistor 222, and a two coil, bistable latching relay 224.

Only one such circuit will be shown and described in complete detail: a circuit for a pair $T_{00}$. In that circuit, the NOR gate 220A has its inputs connected to the $T_0$ and $U_0$ lines from the switch control module 40 (although the connection could be to three other tens connections and one other units connection, depending upon the actual number of the switch matrix module 42 as first (lines 0-24), second (lines 25-49), third (lines 50-74) or fourth (lines 75-99).

In the case of the line pair $T_{00}$, the output from the NOR gate 220A is connected to operate the driver transistor 222A, which in turn completes the current path to ground for both coils of the relay 224A. Only one coil of the relay 224A will operate, however, because each is connected to either the A line (through a one way diode 226A) or the B line (through a one way diode 228A). Thus, during a switch sequence which occurs just after the third burst value has been latched into the units decoder 134, the tens line $T_0$, units line $U_0$ and A or B line are all enabled simultaneously.

Current flows from the power bus 90 via one of the A and B lines (by operation of the selected one of the A and B driver transistors 160, 162 (FIG. 3)), through one of the diodes 226A or 228A, through one of the coils of the relay 224A, and finally through the transistor 222A to ground. If the A line is enabled, the relay 224A is operated so that its normally closed contacts 224A-1 and 224A-2 are closed, and its normally open contacts 224A-3 and 224A-4 are open. In the event that the B line is enabled, the opposite situation obtains: the contacts 224A-1 and 224A-2 are open, and the contacts 224A-3 and 224A-4 are closed. In this way the pair $T_{00}$ is connected to either the pair $A_{00}$ or the pair $B_{00}$. The same operation obtains for each of the twenty five relays 224 on each switch matrix module 42.

It is to be understood that the circuits for each line pair are identical. Thus, for the line pair $T_{01}$, the NOR gate 220B would be connected through the transistor 222B to the relay 224B which in turn is connected through the diodes 226B and 228B to the A and B lines.

It is very desirable to provide a method for ascertaining that the tip and ring wires of each T pair are maintained in their correct orientation as tip and ring wires whether connected to the corresponding A or B pair. To check against unwanted tip-ring inversion, a ring conductor identification network is included in the subsystem 14. This network includes a 70 volt zener diode 230 provided for each ring wire of each pair T. Thus, for the pair $T_{00}$, a zener diode 230A is provided. All of the zeners have their anodes connected in common to a line RG which connects back to the switch control module 40.

Returning to FIG. 3, the line RG is connected through a resistor 232, a diode 234, a third, normally open contact 70-3 of the control relay 70 to ground. Thus, during a switch control sequence, when the relay 70 is operated, the contact pair 70-3 closes and connects the zener diodes 230 to ground. Application of a voltage in excess of 70 volts from a telephone test board at the location of the central control system 12 to each ring wire will establish a current path to ground, whereas application of the same voltage to the tip wire of the pair will not provide such an indication testing for tip and ring wire orientation may be carried out as an adjunct to conventional breakdown voltage testing of the lines at the central office. It should be noted that the zener diode 230 appears only on the A trunk side of the switch relay 224. Thus, this test is only possible when the relay is set to the A trunk.

Having thus described one preferred embodiment of the present invention, it will be appreciated by those skilled in the art that the objects of this invention have been achieved in realizing a remote cable switching system. To those skilled in the art to which this invention relates, many changes in construction and widely varying embodiments and applications of the invention will be readily apparent without departing from the spirit or scope of this invention. The disclosures and the description herein are purely illustrative, and are not intended to be in any sense limiting.

We claim:

1. A remote cable switching system for selectively switching communications pairs of an incoming trunk to one or the other pairs of two available outgoing trunks, said system comprising:
   a remote switch module having input terminals accommodating N input pairs and having output terminals accommodating 2N output pairs, and having N latching switches having terminals connecting said N input pairs and said 2N output pairs in accordance with a connection pattern established by switching commands generated and sent from a central location, a normally quiescent remote control module at the location of said remote switch module and operatively connected thereto, said control module for receiving and accumulating electrical power and for receiving and decoding electrical switching commands from a central control location during a command sequence, for generating latch operating signals in response to said commands, and for applying said operating signals to operate the said latching switches to which they pertain, a central controller at a central location remote from said remote switch and control modules, said controller including data input means for receiving switching information and means for converting said switching information into responsive electrical switching commands, said central controller being connected by a control circuit to said remote control module and providing constant current power thereto and electrical switching commands thereto during each command sequence.

2. The remote cable switching system set forth in claim 1 further comprising tip and ring orientation test condition providing means for each said input pair, said test condition providing means operable during a command sequence.

3. The remote cable switching system set forth in claim 2 wherein said test condition providing means comprises a zener diode having a predetermined threshhold voltage and being connected across a predetermined one of the tip and ring wires to ground through a normally open control relay contact set which closes during each command sequence.

4. The remote cable switching system set forth in claim 1 wherein said central controller includes means for generating a multi-tone audio burst sequence, wherein each burst indicates one of switch direction and tens and units of the identity of the latch switch to be operated.

5. The remote cable switching system set forth in claim 4 wherein said normally quiescent remote control module comprises means for decoding said multi-tone audio burst sequence into a binary value indicating switch direction and into a value identifying the latch switch of said remote switch module to be operated, and further comprising means for latching said decoded binary value and said value identifying said latch switch.

6. The remote cable switching system set forth in claim 1 wherein said central controller comprises a constant current source which is connected to provide power to a said remote control module and its remote switch module during a command sequence sent by said central controller to said remote control module.

7. The remote cable switching system set forth in claim 6 wherein said remote control module includes a high value storage capacitor connected to said constant current source of said central controller during a command sequence.

8. The remote cable switching system set forth in claim 7 wherein said remote control module comprises a control relay which is actuated by the presence of constant current from said central controller during a command sequence and which thereupon connects said high value storage capacitor to accumulate power provided from said constant current source during a command sequence.

9. A method for central switching of selectable communications pairs of a remotely located incoming trunk between one or the other corresponding pairs of two co-located outgoing trunks comprising the steps of:

providing at least one switch module of latching switches connected for arranging N pair connections of said remotely located incoming trunk in switched connection between 2N corresponding pairs of said two co-located outgoing trunks in accordance with switching commands and with switch operating energy provided from a central switching location during a command sequence, receiving and decoding switching commands and receiving and accumulating switch operating energy at the remote trunk switch location and then selecting and applying switching power to operate the selected remote latching switch during said command sequence, and generating switching commands from a central location and sending said commands, together with operating power, to the remote switch location via a communications pair connected during a command sequence interval.

10. The method set forth in claim 9 further comprising the step of providing a test condition to indicate the status of tip and ring pair connection orientation of the connected pairs during a command sequence interval and removing the test condition at the end of the interval.

11. The method set forth in claim 9 wherein said step for generating switching commands includes for each latch switch the step of generating a sequence which includes direction of operation of the latch switch and the identification of the switch to be operated.

12. The method set forth in claim 11 wherein step for generating a sequence includes generating a plurality of multi-tone bursts, each burst being indicative of a four bit binary value.

* * * * *